Sept. 3, 1963     F. RUMPELEIN     3,102,460
CAMERAS WITH COUPLED LIGHT METERS
Filed Aug. 21, 1958     2 Sheets-Sheet 1
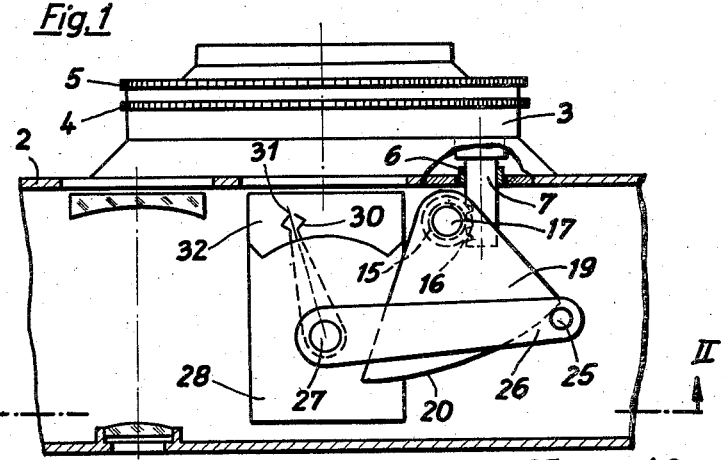
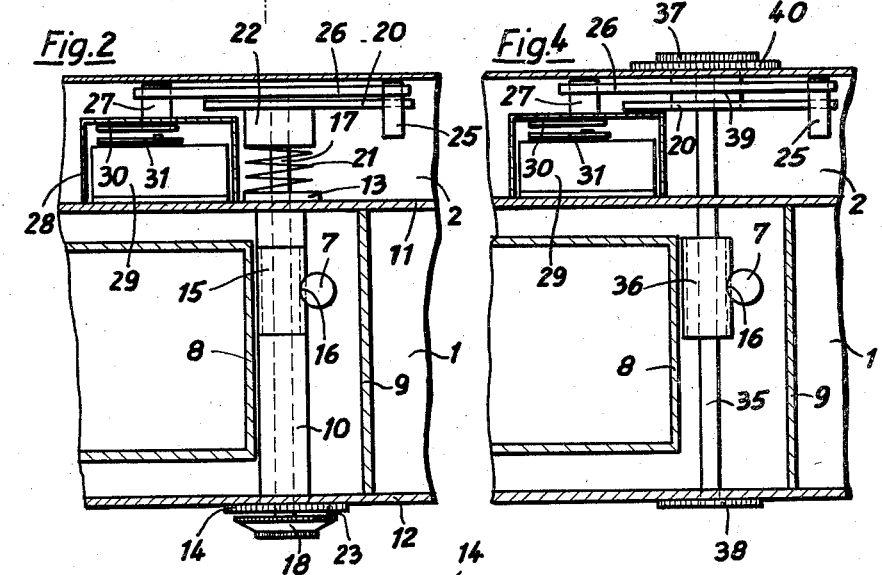
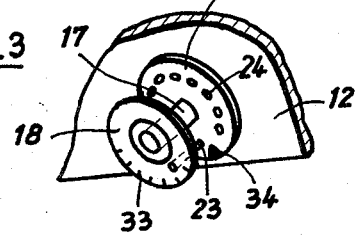
INVENTOR.
Fritz Rumpelein
BY Michael S. Striker
Attorney

大1

3,102,460
CAMERAS WITH COUPLED LIGHT METERS
Fritz Rumpelein, Munich, Germany, assignor to Agfa Aktiengesellschaft, Leverkusen-Bayerwerk, Germany
Filed Aug. 21, 1958, Ser. No. 756,426
Claims priority, application Germany Aug. 28, 1957
8 Claims. (Cl. 95—10)

The present invention relates to cameras and more particularly to cameras with coupled light meters.

In cameras of this type the exposure time and exposure aperture adjusting devices cooperate through a train of motion transmitting elements with the light meter, and this train is exceedingly complex and composed of a large number of elements. Furthermore, when the camera is equipped to be set according to such factors as the film sensitivity, then the structure is even more complex.

One of the objects of the present invention is to provide in a camera of the above type an exceedingly simple train of a small number of motion transmitting elements for operating the light meter or parts cooperating therewith in response to settings of the exposure time and exposure aperture of the camera.

Another object of the present invention is to provide a camera with a relatively simple structure capable of accomplishing the above objects and also capable of being set in a simple way according to an exposure influencing factor in addition to the exposure time and exposure aperture, such as the sensitivity of the film in the camera.

With the above objects in view the present invention includes in a camera a combined light meter and indicator means for measuring the light in the region of the camera and for indicating the relationship between this light and the combination of exposure time and exposure aperture set into the camera. A motion transmitting means cooperates with the combined light meter and indicator means for actuating the same. A moving means cooperates with the motion transmitting means for transmitting motion therethrough to the combined light meter and indicator means, this first moving means actuating the motion transmitting means in response to changes in the combination of exposure time and exposure aperture set into the camera. In accordance with the present invention a manually operable means cooperates with the motion transmitting means for actuating the same independently of the moving means in accordance with an additional exposure factor such as film sensitivity.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary, partly sectional top plan view of a camera showing in a partly diagrammatic manner one embodiment of the structure of the present invention;

FIG. 2 is a fragmentary sectional elevational view taken along line II—II of FIG. 1 in the direction of the arrows;

FIG. 3 is a fragmentary perspective view showing a clutch of FIG. 2 in a disengaged position;

FIG. 4 is a fragmentary sectional elevational view of another embodiment of the structure of the present invention.

Figure 5:
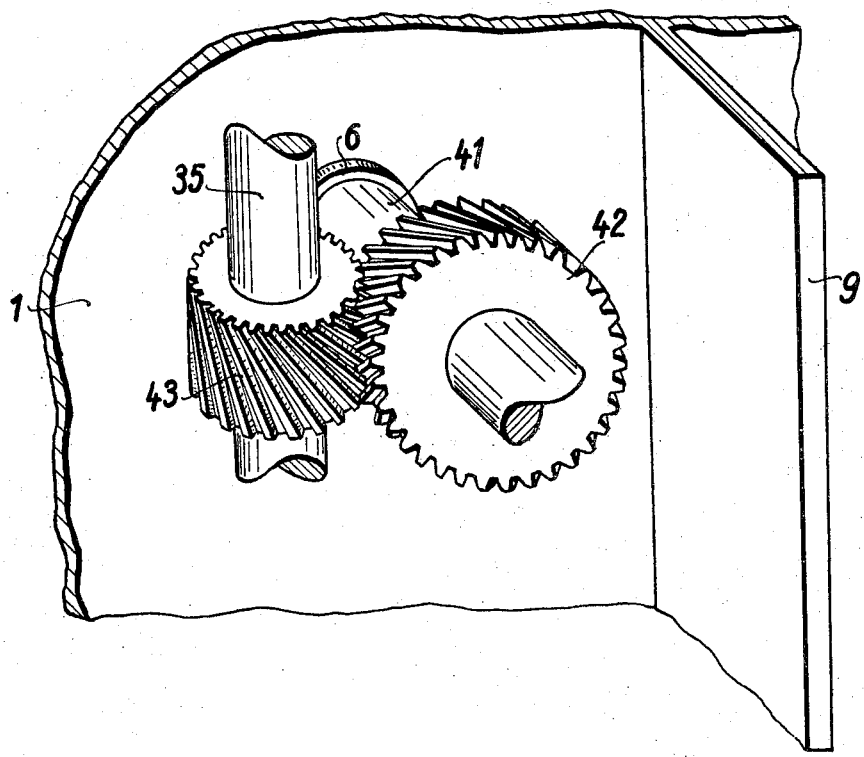
FIG. 5 shows a transmission different from that of FIGS. 1–4 capable of being used with the embodiments of FIGS. 1–4.

Referring now to the drawings, and in particular to FIGS. 1 and 2, it will be seen that the fragmentarily illustrated camera includes a housing 1 and an upper chamber 2 located over the housing 1. The objective-shutter assembly 3 of the camera includes adjustable exposure-determining means formed by the adjusting rings 4 and 5 which are manually turnable for adjusting the exposure aperture and exposure time, respectively, and these rings cooperate in a known way with a known unillustrated totalizing drive forming part of the assembly 3 for determining the total light value resulting from the combination of the settings of the rings 4 and 5. For example the totalizing drive mentioned in the preceding sentence may be that disclosed in U. S. Patent No. 2,418,370, issued on April 1, 1947. As may be seen from FIG. 1, the front wall portion of the camera which carries the assembly 3 is provided with a sleeve 6 through which a totalizer member 7 extends in a direction parallel to the optical axis, and the totalizing drive places the member 7 in an axial position determined by the combination of exposure time and exposure aperture set into the camera by the rings 4 and 5.

Referring to FIG. 2, it will be seen that the camera includes a light guiding tube 8 through which the light passes from the objective to the film and a wall 9 of a film spool chamber, and between parts 8 and 9 the camera housing carries an elongated axially bored shaft 10 which is supported for rotary movement about its axis by the upper and lower walls 11 and 12 of the housing 1, so that these walls form a support means for the shaft 10. This shaft passes through openings of the walls 11 and 12 and has its ends respectively fixed to discs 13 and 14 located outside of the space between the walls 11 and 12 and respectively engaging the latter, so that these discs 13 and 14 prevent axial movement of the shaft 10. This shaft is provided between walls 11 and 12 with axially extending gear teeth 15 distributed around the axis of the shaft 10 at the exterior thereof and meshing with rack teeth 16 of the totalizer member 7 so that the shaft 10 will be turned upon axial movement of member 7 to an angular position corresponding to the combination of exposure time and exposure aperture set into the camera.

A shaft 17 extends through and is turnable in the shaft 10. This shaft 17 fixedly carries at its bottom end which is located downwardly beyond the disc 14 a knurled knob 18, and at its top end which is located in the chamber 2 the shaft 17 fixedly carries a cam plate 19 having a camming edge 20. A spring 21 is coiled around the shaft 17, bears at its bottom end against the disc 13 and at its top end against a sleeve 22 through which the shaft 17 extends, this sleeve 22 being located next to the cam 19. Thus, the spring 21 acts as a spring means for urging the knob 18 toward the disc 14. The disc 14 and the member 18 form a clutch means for transmitting rotary movement of shaft 10 to shaft 17 when the clutch is engaged, and for this purpose, as shown in FIG. 3, the disc 14 is formed with an annular row of openings 24 adapted to selectively receive the pin 23 which is fixed to the knob 18, so that when pin 23 is in one of the openings 24 the clutch is engaged and the shafts 10 and 17 will rotate together.

The camming edge 20 of cam 19 is engaged by a follower pin 25 of a motion transmitting lever 26, this lever 26 being fixed to the shaft 27 which is turnably supported by and extends from the housing 28 of a combined light meter and indicator means, this housing 28 having the galvanometer 29 in its interior. An index pointer 30 forms a movable member located in the housing 28 and fixed to the bottom end of the rotary shaft 27, this index pointer 30 being visible together with the galvanometer pointer 31 through the window 32 which is aligned with another window at the top wall of the chamber 2. Elements 27, 31 and 30 have a common turning axis.

Thus, the combined settings of rings 4 and 5 will produce a certain axial positioning of the totalizer member 7 which when it moves axially turns shaft 10 and through the clutch 14, 18 the shaft 17 and cam 19 whose turning movement is transmitted through lever 26 to the index pointer 30, the operator adjusting rings 4 and/or 5 until the pointers 30 and 31 are aligned. When the pointer 30 has been aligned in this way with the light meter pointer 31 the operator knows that the camera has been set with a proper combination of exposure time and exposure aperture. In this way the light meter and index pointer 30 form a combined light meter and indicator means for measuring the light and indicating the relationship between this light and the combination of exposure time and exposure aperture.

The elements 10, 14, 23, 18, 17, 19 25, 26 and 27 form a motion transmitting means for transmitting motion to the combined light meter and indicator means, and the member 7 forms a moving or turning means for actuating this motion transmitting means according to the combination of exposure time and exposure aperture set into the camera. Element 10 forms the input element of the motion transmitting means, while element 27 forms the output element of the motion transmitting means. The knob 18 is a manually operable means forming part of the motion transmitting means for moving the intermediate element 19 of the motion transmitting means independently of the moving or turning means formed by the totalizer member 7 so that the element 19 can be set according to an additional exposure influencing factor such as the sensitivity of the film in the camera. For this purpose the knob 18 is pulled against the force of the spring 21 to disengage the pin 23 from the disc 14 and the knob 18 is turned so as to set cam 19 in a particular angular position corresponding to the exposure index of the film, for example. The knob 18 is provided with a scale of exposure indexes which cooperate with a stationary index member 34 carried by the disc 14, the member 34 being stationary in the sense that it is immovable with respect to disc 14 but of course turns therewith, the scale 33 cooperating with index 34 according to the particular exposure index. When the operator releases the knob 18, the spring 21 returns the parts to the position where pin 23 is in one of the openings 24 so that the clutch 14, 18 is again in its engaged position.

FIG. 4 shows an embodiment of the invention where the elements for setting a factor such as film sensitivity into the camera are located at the top rather than at the bottom thereof, and in FIG. 4 those elements which correspond to the embodiment of FIGS. 1–3 are indicated with the same reference characters. Referring to FIG. 4 it will be seen that a shaft 35 is situated between parts 8 and 9 and is supported by the housing walls for rotary movement. The shaft 35 fixedly carries coaxially therewith a gear 36 as well as a pair of discs 37 and 38 which are respectively fixed to the ends of the shafts 35. The rack teeth 16 of the totalizer member 7 mesh with gear 36 so that the angular position of shaft 35 is determined by the axial position of member 7. A relatively short tubular shaft 39 is located adjacent to the top wall of the chamber 2, and the shaft 35 extends through the hollow shaft 39, this shaft 39 fixedly carrying at the exterior top surface of the camera a knurled adjusting disc 40 located between the disc 37 and the upper wall of the chamber 2. The bottom end of the hollow shaft 39 is fixedly connected to the cam 19 whose camming edge 20 cooperates with the follow pin 25 in the manner described above.

Similarly to the structure shown in FIG. 3, the disc 37 is provided with an index similar to the index 34 and the disc 40 is provided with a scale similar to the scale 33 so that the disc 40 may be turned to set an exposure influencing factor such as film sensitivity into the camera. The discs 37 and 40 are infrictional engagement with each other to form a slip clutch, and for this purpose the faces of elements 37 and 40 which engage each other may be provided with suitable coatings which have high coefficients of friction. Thus, the disc 40 may be manually turned in order to angularly set the cam 19 independently of the moving means 7. In the embodiment of FIG. 4 the elements 36, 35, 37, 40, 39, 19, 25 and 26 form the motion transmitting means for transmitting movement of element 7 to the combined light meter and indicator means. Of course, the lever 26 is urged in a counterclockwise direction, as viewed in FIG. 1, by any suitable spring (not shown) so as to maintain the follower pin 25 in engagement with the camming edge 20.

Although two different clutch constructions are shown in FIGS. 3 and 4, it is evident that the clutch means of the invention may take other forms.

Furthermore, instead of an axially movable totalizer member 7 having rack teeth, a rotary totalizer member 41 (FIG. 5) having threads 42 cooperating with threads 43 on the shafts 10 or 35 may be provided, and it will be noted that in such a construction the totalizer member 41 still extends parallel to the optical axis and is perpendicular to the shafts 10 or 35. The rotary totalizer member 41 may, for instance, be actuated by a totalizing drive of the type disclosed in U. S. Patent No. 2,305,294, issued on December 15, 1942.

While the invention has been illustrated and described as embodied in cameras having coupled light meters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera having an adjustable exposure-determining means, in combination, moving means adapted to be moved by the exposure-determining means of the camera to a position determined by the setting of the exposure-determining means; motion transmitting means made up of a train of elements starting with an input element, ending with an output element, and including after said input element and before said output element a cam and a cam follower, said moving means being operatively connected with said input element of said motion transmitting means to move the latter; a light meter having a pointer; a movable member operatively connected to said output element to be moved thereby, said movable member cooperating with said pointer for indicating proper setting of the camera; clutch means forming part of said motion transmitting means and cooperating with said cam for releasably maintaining the latter in an operative position participating in the transmission of motion from said input to said output element; and manually operable means cooperating with said clutch means for actuating the latter to move said cam independently of motion derived from said moving means.

2. In a camera as recited in claim 1, a film-sensitivity scale cooperating with said manually operable means for indicating to the operator the setting of said manually operable means according to the sensitivity of the film used in the camera, whereby the factor of film sensitivity may be introduced into the camera through said cam.

3. In a camera as recited in claim 1, said camera having an underside, and said manually operable means being located at the underside of said camera.

4. In a camera as recited in claim 1, said camera having a topside and said manually operable means being located at said topside of the camera.

5. In a camera as recited in claim 1, said clutch means being a slip clutch.

6. In a camera as recited in claim 1, said clutch means being a positive clutch having a disengaged position when said cam is moved by said manually operable means independently of said moving means and having an engaged position when said cam participates in the transmission of motion from said moving means to said movable member.

7. In a camera as recited in claim 1, said motion transmitting means including a tubular shaft and a solid shaft extending coaxially through said tubular shaft, said cam being fixed to one of said shafts for turning movement therewith and the other of said shafts forming the input element of said motion transmitting means, said clutch means interconnecting said shafts for rotary movement together except when said clutch means is actuated by said manually operable means.

8. In a camera as recited in claim 7, said clutch means including a pair of clutch members respectively fixed to said shafts and one of said clutch members having an exterior portion accessible to the operator and forming said manually operable means.

References Cited in the file of this patent
UNITED STATES PATENTS

| | | |
|---|---|---|
| 2,209,156 | Fischer | July 23, 1940 |
| 2,388,609 | Ericsson | Nov. 6, 1945 |
| 2,418,370 | Simmon | Apr. 1, 1947 |
| 2,576,813 | Simons | Nov. 27, 1951 |
| 2,630,049 | Stein | Mar. 3, 1953 |
| 2,849,936 | Fahlenberg | Sept. 2, 1958 |
| 2,868,095 | Gebele | Jan. 13, 1959 |
| 2,887,026 | Rentschler | May 19, 1959 |
| 2,926,571 | Sommer | May 1, 1960 |